(12) United States Patent
Usuki

(10) Patent No.: US 8,942,276 B2
(45) Date of Patent: Jan. 27, 2015

(54) TRANSMISSION APPARATUS

(71) Applicant: Fujitsu Limited, Kawasaki-shi, Kanagawa (JP)

(72) Inventor: Tatsuya Usuki, Tsukuba (JP)

(73) Assignee: Fujitsu Limited, Kawasaki (JP)

( * ) Notice: Subject to any disclaimer, the term of this patent is extended or adjusted under 35 U.S.C. 154(b) by 32 days.

(21) Appl. No.: 13/737,124

(22) Filed: Jan. 9, 2013

(65) Prior Publication Data

US 2013/0182751 A1    Jul. 18, 2013

(30) Foreign Application Priority Data

Jan. 12, 2012    (JP) ................................ 2012-004181

(51) Int. Cl.
    *H04B 1/38*        (2006.01)
    *H04L 5/16*        (2006.01)
    *H04L 25/49*       (2006.01)
    *H04L 25/02*       (2006.01)

(52) U.S. Cl.
    CPC .............. *H04B 1/38* (2013.01); *H04L 25/4906* (2013.01); *H04L 25/0272* (2013.01); *Y02B 60/31* (2013.01)
    USPC ............................................. 375/219; 710/1

(58) Field of Classification Search
    USPC ....................................................... 375/219
    See application file for complete search history.

(56) References Cited

U.S. PATENT DOCUMENTS

| | | | |
|---|---|---|---|
| 5,625,780 A * | 4/1997 | Hsieh et al. ................... | 710/316 |
| 2004/0091271 A1 * | 5/2004 | Fishman et al. .............. | 398/139 |
| 2005/0140527 A1 * | 6/2005 | Ichinose et al. ................ | 341/58 |
| 2009/0067734 A1 * | 3/2009 | Kalevo .......................... | 382/238 |
| 2013/0179628 A1 * | 7/2013 | Sekiya ......................... | 711/103 |

OTHER PUBLICATIONS

D. Miller; "Device Requirements for Optical Interconnects to Silicon Chips;" Proceedings of the IEEE; vol. 97; No. 7; Jul. 2009; pp. 1166-1185 (20 Sheets)/p. 1 of the specification.
A. Narasimha, et al.; "An Ultra Low Power CMOS Photonics Technology Platform for H/S Optoelectronic Transceivers at less than $1 per Gbps;" Conference on Optical Fiber Communication (OFC); 2010; 3 Sheets/p. 2 of specification.
F. Tavernier, et al.; "A 5.5 Gbit/s Optical Receiver in 130 nm CMOS with Speed-Enhanced Integrated Photodiode;" Proceedings of the ESSCIRC; 2010; pp. 542-545 (4 Sheets)/p. 2 of specification.
S. Herbert, et al.; "Variation-Aware Dynamic Voltage/Frequency Scaling;" IEEE 15th International Symposium HPCA; 2009; pp. 301-312 (12 Sheets)/p. 2 of specification.
Y. Hidaka, et al.; "A 4-Channel 1.25-10.3 Gb/s Backplane Transceiver Macro With 35 dB Equalizer and Sign-Based Zero-Forcing Adaptive Control;" IEEE Journal of Solid-State Circuits; vol. 44; No. 12; Dec. 2009; pp. 3547-3559 (13 Sheets)/p. 2 of specification.
A. Widmer, et al.; "A DC-Balanced, Partitioned-Block, 8B/10B Transmission Code;" IBM J. Res. Develop.; vol. 27; No. 5; Sep. 1983; pp. 440-451 (12 Sheets)/p. 2 of specification.

* cited by examiner

*Primary Examiner* — Erin File
(74) *Attorney, Agent, or Firm* — Kratz, Quintos & Hanson, LLP

(57) ABSTRACT

There is provided a transmission apparatus which includes a transmitting circuit that receives a bit string in which an input bit string expressed as combination of 0 and 1 is preceded by a 1-bit value 0, computes a difference value between two bits adjacent to each other in the bit string, the difference value being one of among +1, 0, or −1, and sends the computed difference value, and a receiving circuit that stores a 1-bit value with an initial value of 0, receives the difference value +1, 0, or −1 sent by the transmitting circuit, calculates a sum of the received difference value and the stored 1-bit value, outputs, as a value of a receiving signal, 1 if the sum is 1 or more or 0 if the sum is 0 or less, and updates the stored 1-bit value to the value of the output receiving signals.

11 Claims, 8 Drawing Sheets

| S | R | Action |
|---|---|--------|
| 0 | 0 | No change |
| 0 | 1 | Q=0 |
| 1 | 0 | Q=1 |
| 1 | 1 | Forbidden state |

TRANSMISSION APPARATUS

CROSS-REFERENCE TO RELATED APPLICATION

This application is based upon and claims the benefit of priority of the prior Japanese Patent Application No. 2012-004181, filed on Jan. 12, 2012, the entire contents of which are incorporated herein by reference.

FIELD

The embodiments discussed herein are related to a transmission apparatus.

BACKGROUND

The volume of data transferred between complementary metal oxide semiconductor (CMOS) large scale integrated circuits (LSI) or within a CMOS LSI is increasing, and an optical transmission technology of the order of 10 Tbit/second that employs silicon photonics for achieving a small size, low power consumption, and good compatibility with LSI processes is receiving attention. This transmission technology is demanded to have a transmission rate of 10 Gbit/sec or higher for each channel and parallel transmission in hundreds of channels (see, for example, D. A. B. Miller, "Device Requirements for Optical Interconnects to Silicon Chips", *Proceedings of the IEEE*, Vol. 97, pp. 1166-1185, 2009).

An electrical/optical or optical/electrical conversion device has to satisfy both electrical design and optical design, and is likely to degrade in a high frequency area as compared with the response characteristics of a CMOS circuit electrically optimized and fabricated with the same process technology which is applied to the electrical/optical or optical/electrical conversion device. There is a case in which a signal is transferred through capacitive coupling between a photoreceptor and a CMOS circuit to apply a bias exceeding the maximum allowable level of CMOS to the photoreceptor (see, for example, A. S. Narasimha, et al., "An ultra low power CMOS photonics technology platform for H/S optoelectronic transceivers at less than $1 per Gbps", *Conference on Optical Aber Communication (OFC)*, 2010 and F. Tavernier, and M. S. Steyaert, "A 5.5 Gbit/s optical receiver in 130 nm CMOS with speed-enhanced integrated photodiode", *Proceedings of the ESSCIRC*, 2010). However, capacitive coupling blocks signals in a low frequency area.

When the response characteristics of a transfer circuit including optical transmission depends on the frequency area as described above, if a binary digital signal is transmitted as is, a receiving signal is distorted. Such distortion due to suppression in a high frequency area or low frequency area is referred to as intersymbol interference (ISI), which causes a data error.

On the other hand, in an environment to which each channel is exposed, the temperature greatly changes, for example, from −20 degrees to 85 degrees and variations are present in the element characteristic for each channel, so the response characteristics of the transfer circuit is likely to fluctuate from the design value. In addition, it is assumed that the operating frequency of a semiconductor chip may vary depending on the situation in data communication within the semiconductor chip (see, for example, S. Herbert, et al., "Variation-aware dynamic voltage/frequency scaling", *IEEE 15th International Symposium HPCA* 2009, pp. 301-312, 2009).

When intersymbol interference is present in the transfer circuit and the characteristic varies as described above, intersymbol interference caused by suppression in a high frequency area is addressed by adaptive equalization (see, for example, Y. Hidaka, et al., "A 4-Channel 1.25-10.3 Gb/s Backplane Transceiver Macro With 35 dB Equalizer and Sign-Based Zero-Forcing Adaptive Control", *IEEE J. Solid-State Circuits*, Vol. 44, pp. 3547-3559, 2009). Adaptive equalization is a dynamic analog processing technology in which distortion for correcting response characteristics is added to a transmitting signal or receiving signal to recover the signal. Intersymbol interference caused by suppression in a low frequency area is addressed by 8b/10b, which is a known technology for devising a transmission protocol (see, for example, A. X. Widmer and P. A. Franaszek, "A DC-Balanced, Partitioned-Block, 8B/10B Transmission Code", *IBM Journal of Research and Development*, Vol. 27, pp. 440-451, 1983).

For backplane use or more distant data transmission, the above technology is generally used to reduce data errors. However, adaptive equalization or a protocol such as 8b/10b leads to complicated implementation and is not suited for data communication accompanied by high-density mounting between semiconductor chips or within a semiconductor chip.

SUMMARY

According to an aspect of the invention, a transmission apparatus includes a transmitting circuit that receives a bit string in which an input bit string expressed as combination of 0 and 1 is preceded by a 1-bit value 0, computes a difference value between two bits adjacent to each other in the bit string, the difference value being one of among +1, 0, or −1, and sends the computed difference value, and a receiving circuit that stores a 1-bit value with an initial value of 0, receives the difference value +1, 0, or −1 sent by the transmitting circuit, calculates a sum of the received difference value and the stored 1-bit value, outputs, as a value of a receiving signal, 1 if the sum is 1 or more or 0 if the sum is 0 or less, and updates the stored 1-bit value to the value of the output receiving signals.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

First Embodiment

Figure 1:
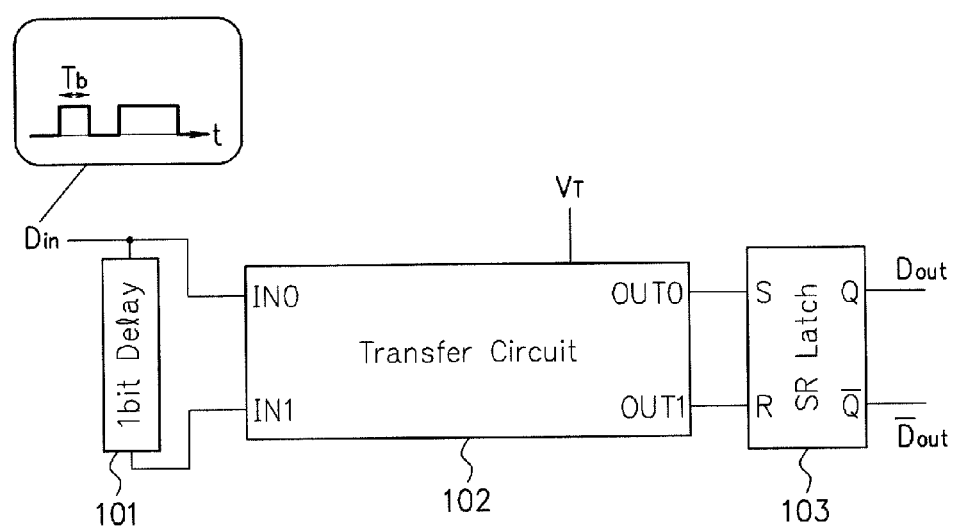
FIG. 1 is a block diagram depicting an example of the structure of a transmission apparatus according to a first embodiment.

FIG. 1 is a block diagram depicting an example of the structure of a transmission apparatus according to a first embodiment. The transmission apparatus includes a delay circuit 101, a differential signal transfer circuit 102, and a set/reset (SR) latch circuit 103. An input data bit string Din is input to an input terminal IN0 of the differential signal transfer circuit 102 in one bit time Tb. The delay circuit 101 delays the input data bit string Din by one bit and outputs the delayed input data bit string Din to an input terminal IN1 of the differential signal transfer circuit 102. The differential signal transfer circuit 102 receives a threshold voltage $V_T$, transmits the input data bit string Din and the bit string delayed by the delay circuit 101 as a differential signal, and outputs the transmitted differential signal from output terminals OUT0 and OUT1. The set/reset latch circuit 103 receives the bit string output from the output terminal OUT0 from a set terminal S and the bit string output from the output terminal OUT1 from a reset terminal R, and latches the received bit string. Then, the set/reset latch circuit 103 outputs a latched bit string Dout from an output terminal Q and a bit string /Dout, which is the inverse logic bit string of the bit string Dout, from an output terminal /Q.

Figure 2:
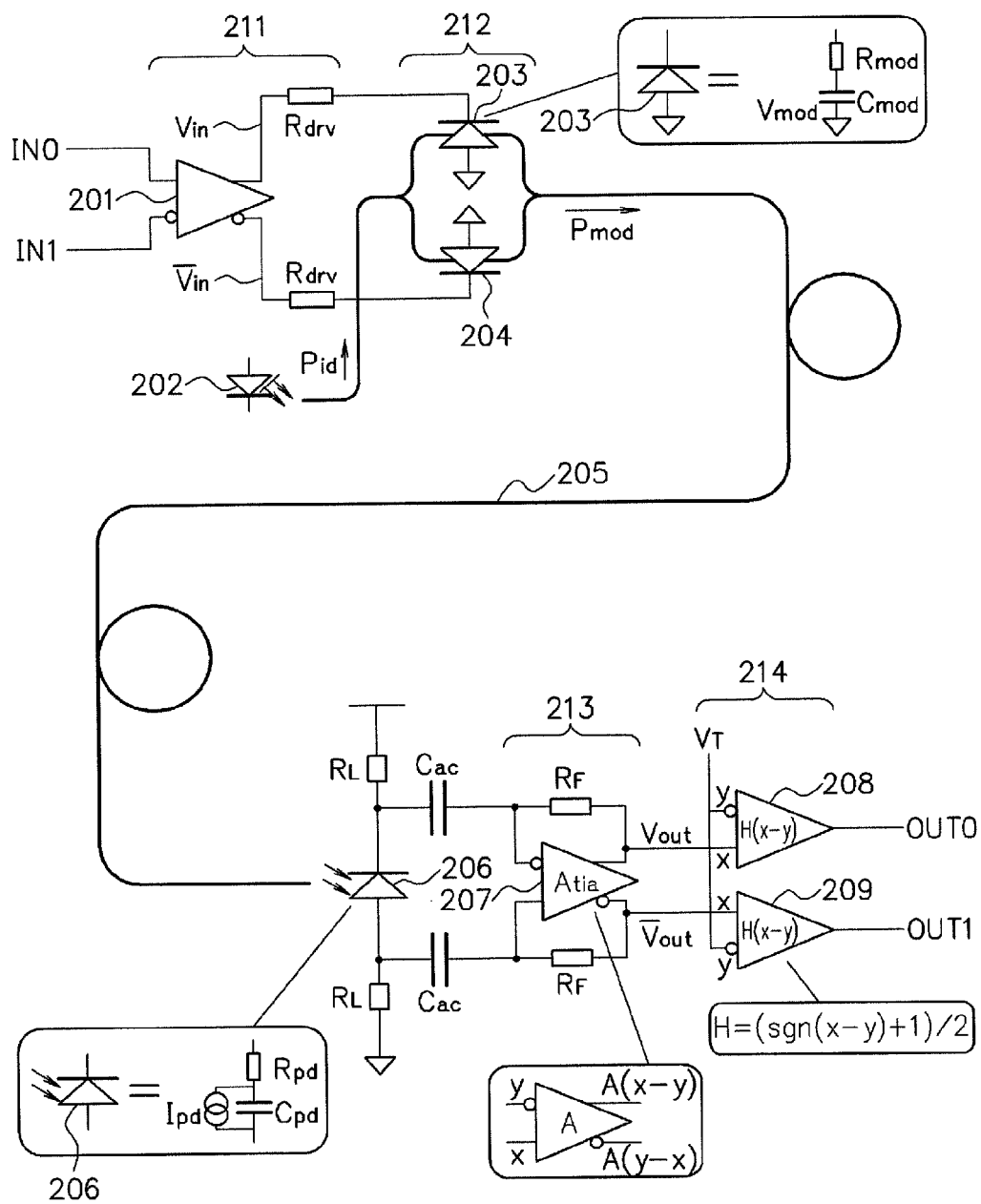
FIG. 2 is a circuit diagram depicting an example of the structure of a differential signal transfer circuit in FIG. 1.

FIG. 2 is a circuit diagram depicting an example of the structure of the differential signal transfer circuit 102 in FIG. 1. The differential signal transfer circuit 102 includes a transmitting circuit and a receiving circuit.

First, the transmitting circuit is described. A driver amplifier 211 includes a differential amplifier 201 and resistors Rdrv. The differential amplifier 201 performs differential amplification of signals from input terminals IN0 and IN1 and outputs the amplified differential signals Vin and /Vin to phase shifters 203 and 204. A Mach-Zehnder modulator 212 includes the phase shifters 203 and 204. Each of the phase shifters 203 and 204 is represented as an equivalent circuit including a resistor Rmod and a capacitor Cmod connected in series. A laser diode 202 outputs laser light Pid to the phase shifters 203 and 204 via an optical waveguide 205. The phase shifters 203 and 204 convert differential electrical signals Vin and /Vin into a light signal Pmod and send the light signal Pmod to a photodiode 206 via the optical waveguide 205.

Next, the receiving circuit is described. The photodiode 206 has one end connected to a power potential node via a resistor $R_L$ and the other end connected to a reference potential node via a resistor $R_L$, converts the light signal Pmod to differential electrical signals, and outputs the differential electrical signals to a differential amplifier 207 via coupling capacitors Cac. The photodiode 206 is represented as an equivalent circuit including a resistor Rpd, a capacitor Cpd, and a current source Ipd. A transimpedance amplifier 213 includes a differential amplifier 207 and resistors $R_F$. The differential amplifier 207 amplifies the differential signals and outputs the amplified differential signals Vout and /Vout. A limiting amplifier 214 includes a first comparator 208 and a second comparator 209. The first comparator 208 outputs 1 to the output terminal OUT0 if the voltage signal Vout is greater than the threshold voltage $V_T$ or outputs 0 to the output terminal OUT0 if the voltage signal Vout is less than the threshold voltage $V_T$. The second comparator 209 outputs 1 to the output terminal OUT1 if the voltage signal /Vout is greater than the threshold voltage $V_T$ or outputs 0 to the output terminal OUT1 if the voltage signal /Vout is less than the threshold voltage $V_T$.

Figure 3:
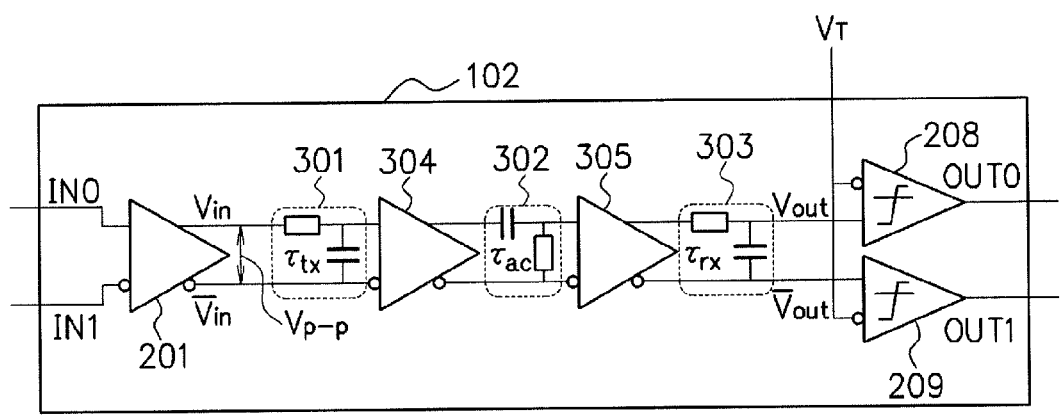
FIG. 3 depicts an equivalent circuit of a differential signal transfer circuit in FIG. 2.

FIG. 3 depicts an equivalent circuit of the differential signal transfer circuit 102 in FIG. 2. The differential amplifier 201 performs differential amplification of signals from the input terminals IN0 and IN1 and outputs the amplified differential signals Vin and /Vin to a low-pass filter 301. A voltage Vp-p is the peak-to-peak voltage of the differential signals Vin and /Vin. The low-pass filter 301 is an equivalent circuit of the Mach-Zehnder modulator (electrical/optical converter) 212 in the transmitting circuit in FIG. 2 and is a low-pass filter with the time constant τtX. A differential amplifier 304 amplifies output differential signals from the low-pass filter 301 and outputs the amplified differential signals to a high-pass filter 302. The high-pass filter 302 is an equivalent circuit of an alternate current (AC) coupling circuit including a coupling capacitor Cac in FIG. 2 and is a high-pass filter with the time constant τac. A differential amplifier 305 amplifies output differential signals from the high-pass filter 302 and outputs the amplified differential signals to a low-pass filter 303. The low-pass filter 303 is an equivalent circuit of a photodiode (optical/electrical converter) 206 in the receiving circuit in FIG. 2 and is a low-pass filter with the time constant τrX. If the high-pass filter 302 and the low-pass filter 303 are interchanged in position, the function of the equivalent circuit is the same. The low-pass filter 303 outputs the differential signals Vout and /Vout. The first comparator 208 outputs 1 to the output terminal OUT0 if the voltage signal Vout is greater than the threshold voltage $V_T$ or outputs 0 to the output terminal OUT0 if the voltage signal Vout is less than the threshold voltage $V_T$. The second comparator 209 outputs 1 to the output terminal OUT1 if the voltage signal /Vout is greater than the threshold voltage $V_T$ or outputs 0 to the output terminal OUT1 if the voltage signal /Vout is less than the threshold voltage $V_T$.

As described above, the electrical/optical converter in the transmitting circuit is represented by the low-pass filter 301 with the time constant τtX, the optical/electrical converter in the receiving circuit is represented by the low-pass filter 303 with the time constant τrX, and the alternate current coupling in the receiving circuit is represented by the high-pass filter 302 with the time constant τac. The comparators 208 and 209 compare analog voltage signals Vout and /Vout with the threshold voltage $V_T$, perform conversion to a binary signal of 0 or 1, and output the converted binary signal from the output terminals OUT0 and OUT1. The present embodiment applies to any differential signal transfer circuit 102 that is represented by an equivalent circuit 102 in FIG. 3. For example, USB (universal serial bus) 3.0 static equalization may also be used.

Figure 4:
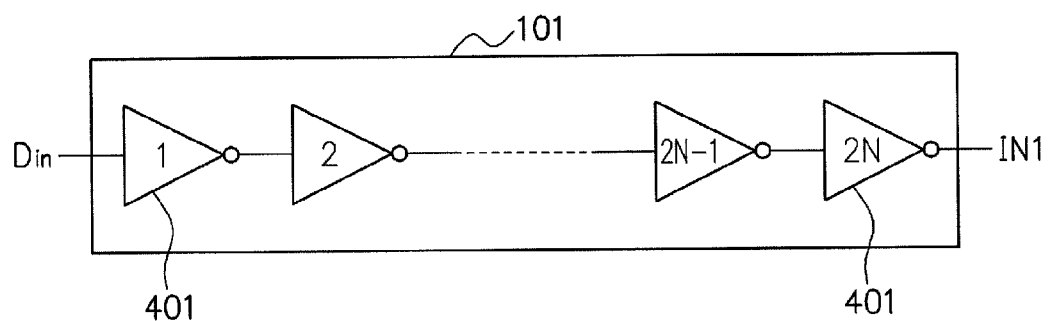
FIG. 4 is a circuit diagram depicting an example of the structure of a delay circuit in FIG. 1.

FIG. 4 is a circuit diagram depicting an example of the structure of the delay circuit 101 in FIG. 1. The delay circuit 101 includes an even number of inverters 401 and delays the input data bit string Din by one bit. The delay time is not necessarily limited to one bit time Tb and has only to be one bit time Tb or less.

Figures 5A, 5B:
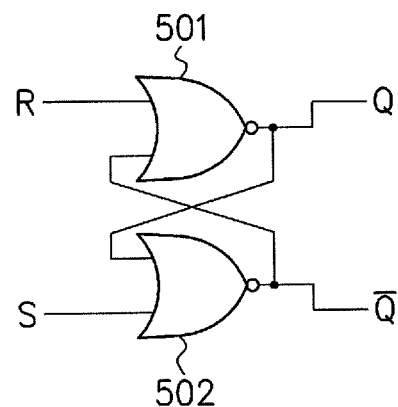
FIG. 5A is a circuit diagram depicting an example of the structure of a set/reset latch circuit in FIG. 1.
FIG. 5B depicts a truth table for the set/reset latch circuit.

FIG. 5A is a circuit diagram depicting an example of the structure of the set/reset latch circuit 103 in FIG. 1. FIG. 5B depicts a truth table for the set/reset latch circuit 103. The set/reset latch circuit 103 includes non-disjunction or negative OR (NOR) circuits 501 and 502. The non-disjunction circuit 501 outputs the non-disjunction of the value of a reset terminal R and the value of the output terminal /Q to the output terminal Q. The non-disjunction circuit 502 outputs the non-disjunction of the value of a set terminal S and the value of the output terminal Q to the output terminal /Q. When the value of the set terminal S is 0 and the value of the reset terminal R is 0, the values of the output terminals Q and /Q are the same as the previous values. When the value of the set terminal S is 0 and the value of the reset terminal R is 1, the value of the output terminal Q is 0 and the value of the output terminal /Q is 1. When the value of the set terminal S is 1 and the value of the reset terminal R is 0, the value of the output terminal Q is 1 and the value of the output terminal /Q is 0. When the value of the set terminal S is 1 and the value of the reset terminal R is 1, the operation becomes unstable and a forbidden state is entered. The set/reset latch circuit 103 may have a structure other than that including the non-disjunction circuits 501 and 502, as long as the true table in FIG. 5B is satisfied.

Figure 6A:
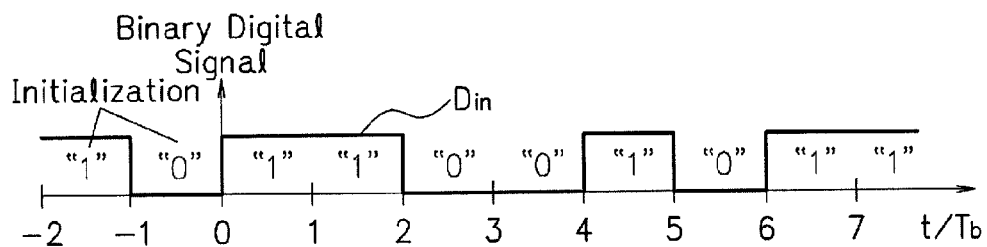
FIGS. 6A to 6C are time charts depicting an example of operation of the transmission apparatus in FIG. 1.
Figure 6B:
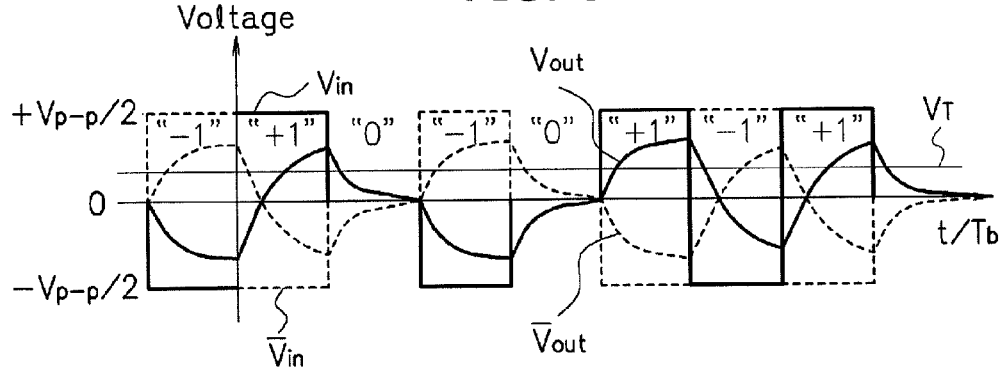
Figure 6C:
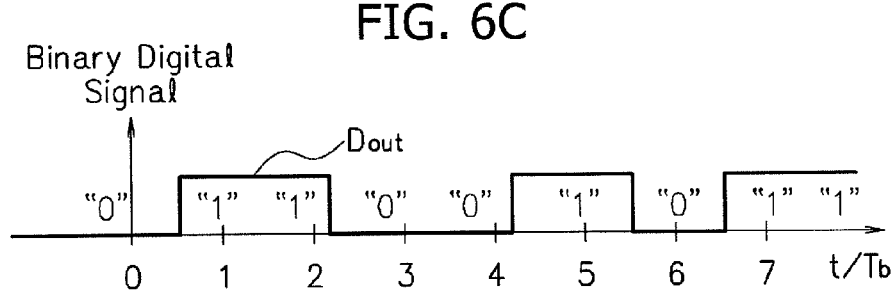

FIGS. 6A to 6C are time charts depicting an example of operation of the transmission apparatus in FIG. 1. FIG. 6A is a time chart depicting an example of the input data bit string Din in FIG. 1. The horizontal axis represents time in t/Tb where t is time and Tb is one bit time. The vertical axis represents the value of the binary digital signal. The input data bit string Din is a bit string in which an input bit string expressed as combination of 1 and 0 is preceded by a 2-bit initial value 10. For example, the initial value 10 is followed by the data bit string 11001011. In the input data bit string Din, the high level represents 1 and the low level represents 0.

FIG. 6B is a time chart depicting an example of transmitting differential signals Vin and /Vin and receiving differential signals Vout and /Vout in FIG. 3. The value +1 is represented by the voltage +(Vp-p)/2, the value 0 is represented by the common voltage 0 V, and the value −1 is represented by the voltage −(Vp-p)/2. The differential amplifier 201 in FIG. 3 amplifies signals from the input terminals IN0 and IN1 as differential signals and outputs the amplified differential signals Vin and /Vin. That is, the differential amplifier 201 subtracts the value (previous bit value) of the input terminal IN1 from the value (current bit value) of the input terminal IN0 and outputs the resulting value using the value +1, 0, or −1 as the signal Vin. The signal /Vin has a sign opposite to that of the signal Vin.

For example, at time −1, the previous bit value 1 is subtracted from the current bit value 0, the value −1 (=0−1) is output as the signal Vin and the value +1 is output as the signal /Vin. At time 0, the previous bit value 0 is subtracted from the current bit value 1, the value +1 (=1−0) is output as the signal Vin and the value −1 is output as the signal /Vin. At time 1, the previous bit value 1 is subtracted from the current bit value 1, the value 0 (=1−1) is output as the signal Vin and the value 0 is output as the signal /Vin.

The receiving differential signals Vout and /Vout are output signals from the low-pass filter 303, which are the transmitting differential signals Vin and /Vin distorted due to the transmission characteristics. The first comparator 208 outputs 1 if the voltage signal Vout is greater than the threshold voltage $V_T$ or outputs 0 if the voltage signal Vout is less than the threshold voltage $V_T$. The second comparator 209 outputs 1 if the voltage signal /Vout is greater than the threshold voltage $V_T$ or outputs 0 if the voltage signal /Vout is less than the threshold voltage $V_T$.

Here, the threshold voltage $V_T$ is set to a positive voltage so that both of the output terminals OUT0 and OUT1 do not output 1. The common voltage of the differential signals Vin and /Vin and the differential signals Vout and /Vout is 0 V in this example, but the common voltage is not limited to 0 V.

FIG. 6C is a time chart depicting an example of the output bit string Dout of the set/reset latch circuit 103 in FIG. 1. First, before time 0 at which transmission starts, a bit string Din of 10 is transmitted as the initial value to initialize the set/reset latch circuit 103. That is, since the voltage signal Vout is less than the threshold voltage $V_T$ before time 0, the set terminal S outputs 0 and the reset terminal R outputs 1. As a result, the output bit string Dout is initialized to 0. Next, if the voltage signal Vout becomes greater than the threshold voltage $V_T$ after time 0, the set terminal S outputs 1 and the reset terminal R outputs 0. As a result, the output bit string Dout becomes 1. Next, if the voltage signal Vout becomes less than the threshold voltage $V_T$ after time 1, the set terminal S outputs 0 and the reset terminal R outputs 0. As a result, the output bit string Dout keeps the same value 1 as in the previous time. Next, if the voltage signal /Vout becomes greater than the threshold voltage $V_T$ after time 2, the set terminal S outputs 0 and the reset terminal R outputs 1. As a result, the output bit string Dout becomes 0. The value of the output bit string Dout is determined in the same manner. The output bit string Dout has the same value as the input bit string Din.

As described above, the input bit string Din is input as a binary bit string expressed as combination of 0 and 1. Next, in the differential signal transfer circuit 102, the differential signals Vin and /Vin and the differential signals Vout and /Vout are transmitted as ternary bit strings expressed as combination of −1, 0 and 1. Finally, the output bit strings Dout and /Dout are output as a binary bit string expressed as combination of 0 and 1.

Figure 7:
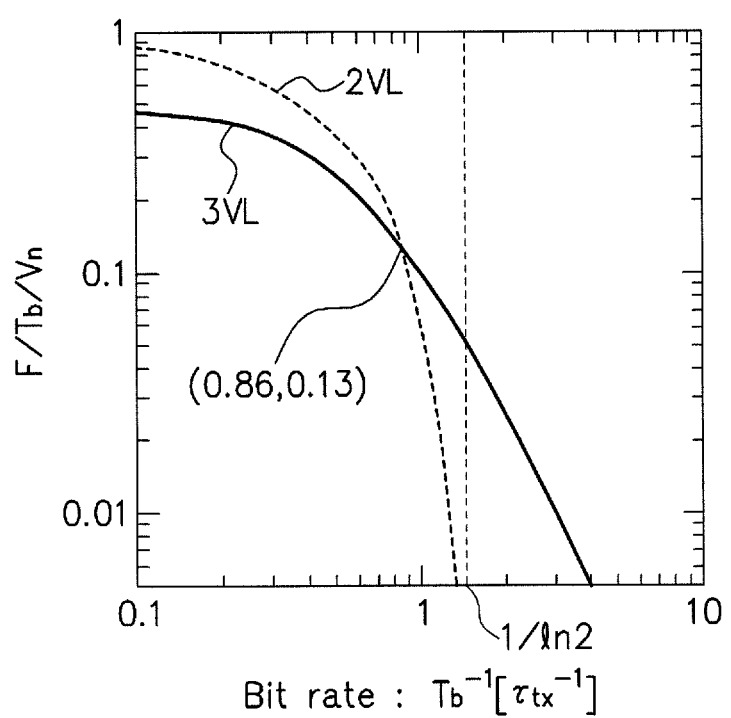
FIG. 7 is a graph depicting the relationship between bit rates and bit errors.

FIG. 7 is a graph depicting the relationship between the bit rate and bit errors. Since the receiving differential signals Vout and /Vout include jitter, bit errors depend on two variables, which are the sampling timing and threshold voltage $V_T$. Accordingly, the region in which the output bit string Dout has no errors is defined by the area of the two variables, which are the threshold voltage $V_T$ and sampling timing, and the area is assumed to be F. The horizontal axis represents the bit rate in 1/Tb. The vertical axis represents the normalized area in F/(Tb×Vn). In this expression, the voltage Vn is a voltage amplitude when the high-pass filter 302 is not present (1/τac=0) and the bit rate is 0 (the input bit string Din is direct current). FIG. 7 is a graph depicting the relationship between the area (F/(Tb×Vn)) in which the output bit string Dout has no errors and the bit rate (1/Tb). Since frequency characteristics is often degraded by an electrical/optical converter of the transmitting circuit, the low-pass filter 303 and the high-pass filter 302 are assumed to not be present (πtX=1/τac=0) to neglect the frequency characteristics of the receiving circuit and the bit rate of the horizontal axis is normalized by 1/πtX.

A characteristic 3VL represents the characteristic of the transmission apparatus in FIG. 1. A characteristic 2VL represents the characteristic when differential signals having mutually reversed phases are input to the input terminals IN0 and IN1 in FIG. 3 and binary transmission is performed by the differential signal transfer circuit 102 alone. At the lowest bit rate, the characteristic 2VL is twice as large as the characteristic 3LV in area F/(Tb×Vn). However, this difference may be compensated by, for example, increasing the optical power of the light source and doubling the gain of the transfer circuit.

The magnitude relation of the area F/(Tb×Vn) between the characteristic 2VL and the characteristic 3VL changes at a bit rate 0.86/πtX. If the bit rate is greater than 0.86/πtX, the characteristic 3VL has a larger area F/(Tb×Vn) than the characteristic 2VL. When the bit rate is equal to or greater than 1.443/πtX, any attempt in the characteristic 2VL to improve the gain will result in a failure to transmit a bit string. On the other hand, such a limit is not present in the characteristic 3VL, so a bit string may be transmitted.

Next, severer conditions are considered. A simulation was performed assuming that the bit rate is $1.443/\tau X$, the frequency characteristic of the receiving circuit is $\tau X/\tau X=0.05$, and the time constant of alternate current coupling is $\tau X/\tau aC=0.1$. As a result, when $1/\tau ac>0$, a signal was not transmitted in the characteristic 2VL if the bit string was too long. On the other hand, it was found in the characteristic 3VL that a sufficient margin is reserved under conditions that disabled transmission in the characteristic 2VL.

The structure of the transmission apparatus is not limited to the above one if the above functions are achieved. In addition, if the set/reset latch circuit 103 was already initialized to 0, the initial value 10 at the beginning may be changed to the initial value 0 in the input bit string Din in FIG. 6A.

The transmission apparatus has a transmitting circuit and a receiving circuit. The transmitting circuit receives a bit string Din in which an input bit string expressed as combination of 0 and 1 is preceded by a 1-bit value 0, computes a difference value between two bits adjacent to each other as +1, 0, or −1 based on the bit string Din, and sends signals Vin and /Vin, as depicted in FIGS. 6A and 6B. The receiving circuit stores a 1-bit value with an initial value of 0 using, for example, the set/reset latch circuit 103, receives signals Vout and /Vout sent from the transmitting circuit, calculates a sum of the received difference value +1, 0, or −1 and the stored 1-bit value, outputs, as a value of a receiving signal Dout, 1 if the sum is 1 or more or 0 if the sum is 0 or less, and updates the stored 1-bit value to the value of the output receiving signal Dout, as depicted in FIGS. 6B and 6C.

For example, the transmitting circuit includes the delay circuit 101 and the differential amplifier 201. The delay circuit 101 delays the bit string Din preceded by the 1-bit value 0 by one bit. The differential amplifier 201 performs differential amplification of the bit string Din preceded by the 1-bit value 0 and the bit string delayed by the delay circuit 101 and sends the differential signals Vin and /Vin. The receiving circuit includes the set/reset latch circuit 103 that receives the positive differential signal Vout and the negative differential signal /Vout included in the differential signals from the set terminal S and the reset terminal R, respectively, latches the differential signals, and outputs the differential signals as the receiving signals Dout and /Dout.

In addition, the receiving circuit includes the first comparator 208 and the second comparator 209. The first comparator 208 outputs 1 to the set terminal S of the set/reset latch circuit 103 if the positive differential signal Vout is greater than the threshold voltage $V_T$ or outputs 0 to the set terminal S of the set/reset latch circuit 103 if the positive differential signal Vout is less than the threshold voltage $V_T$. The second comparator 209 outputs 1 to the reset terminal R of the set/reset latch circuit 103 if the negative differential signal /Vout is greater than the threshold voltage $V_T$ or outputs 0 to the reset terminal R of the set/reset latch circuit 103 if the negative differential signal /Vout is less than the threshold voltage $V_T$.

When the set/reset latch circuit 103 is initialized by the initial value of the input bit string Vin, the input bit string Vin is preceded by the initial value 10. In this case, the delay circuit 101 delays the bit string Din in which the input bit string is preceded by a 2-bit value 10 by one bit. The differential amplifier 201 performs differential amplification of the bit string Din in which the input bit string is preceded by the 2-bit value 10 and the bit string delayed by the delay circuit 101 and sends the differential signals Vin and /Vin. The set/reset latch circuit 103 is reset by the above 2-bit value 10 and latches 0.

Second Embodiment

Figure 8:
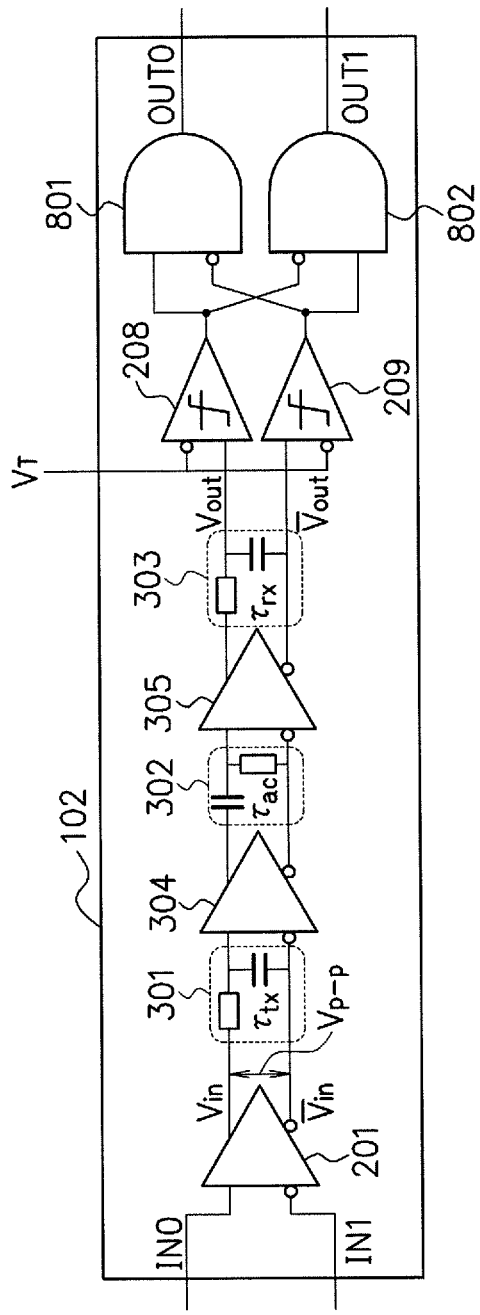
FIG. 8 is a circuit diagram depicting an example of the structure of a differential signal transfer circuit according to a second embodiment.

FIG. 8 is a circuit diagram depicting an example of the structure of a differential signal transfer circuit 102 according to a second embodiment. The differences between the second embodiment and the first embodiment are described below. In the second embodiment (FIG. 8), logical product (AND) circuits 801 and 802 are added as compared with the first embodiment (FIG. 3). The receiving circuit includes the first logical product circuit 801 and the second logical product circuit 802. The first logical product circuit 801 outputs the logical product of the value output from the first comparator 208 and the inverse logic value of the value output from the second comparator 209 to the set terminal S of the set/reset latch circuit 103. The second logical product circuit 802 outputs the logical product of the value output from the second comparator 209 and the inverse logic value of the value output from the first comparator 208 to the reset terminal R of the set/reset latch circuit 103. In the second embodiment, the logical product circuits 801 and 802 are provided as subsequent stages of the comparators 208 and 209 so that the set/reset latch circuit 103 operates even if the threshold voltage $V_T$ is negative.

When an output value of the first comparator 208 is 0 and an output value of the second comparator 209 is 0, the set terminal S of the set/reset latch circuit 103 outputs 0 and the reset terminal R of the set/reset latch circuit 103 outputs 0. When an output value of the first comparator 208 is 0 and an output value of the second comparator 209 is 1, the set terminal S of the set/reset latch circuit 103 outputs 0 and the reset terminal R of the set/reset latch circuit 103 outputs 1. When an output value of the first comparator 208 is 1 and an output value of the second comparator 209 is 0, the set terminal S of the set/reset latch circuit 103 outputs 1 and the reset terminal R of the set/reset latch circuit 103 outputs 0. When an output value of the first comparator 208 is 1 and an output value of the second comparator 209 is 1, the set terminal S of the set/reset latch circuit 103 outputs 0 and the reset terminal R of the set/reset latch circuit 103 outputs 0. If the logical product circuits 801 and 802 are provided, even if the threshold voltage $V_T$ is negative, both the set terminal S and the reset terminal R of the set/reset latch circuit 103 do not output 1 at the same time.

Third Embodiment

Figure 9:
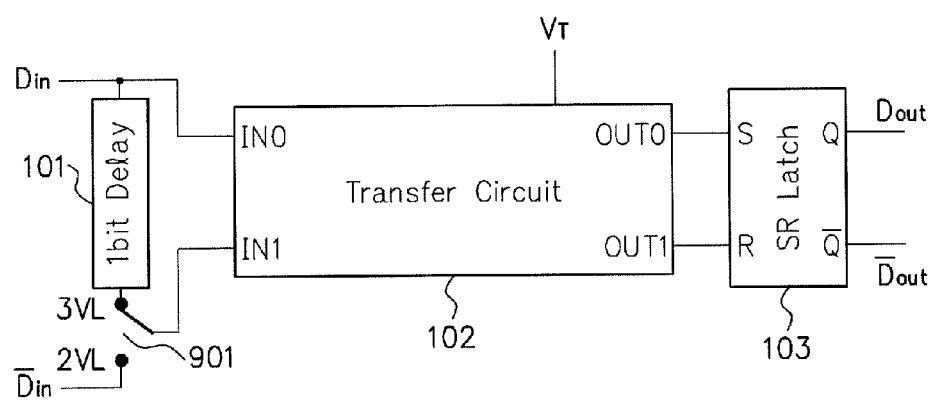
FIG. 9 is a block diagram depicting an example of the structure of a transmission apparatus according to a third embodiment.

FIG. 9 is a block diagram depicting an example of the structure of a transmission apparatus according to a third embodiment. In the transmission apparatus in FIG. 9, a switch 901 is added to the transmission apparatus in FIG. 1. The differences between the third embodiment and the first and second embodiments are described below. If transmission in the characteristic 2VL is performed for a low bit rate or transmission in the characteristic 3VL is performed for a high bit rate in FIG. 7 through control of the switch 901, bit errors may be reduced even if the bit rate changes. In the case of a high bit rate, the switch 901 connects the output terminal of the delay circuit 101 to the input terminal IN1 of the differential signal transfer circuit 102 based on a first control signal to perform transmission in the characteristic 3VL according to the first or second embodiment. In the case of a low bit rate, the switch 901 inputs the inverse input bit string /Din to the input terminal IN1 of the differential signal transfer circuit 102 based on a second control signal to perform transmission in the characteristic 2VL. The inverse input bit string /Din is an inverse logic bit string of the input bit string Din. Accordingly, the input bit string Din and the inverse input bit string /Din constitute differential signals whose phases are opposite to each other.

When the first control signal (of a high bit rate) is input to the switch 901, the differential amplifier 201 performs differential amplification of the input bit string Din and the bit string delayed by the delay circuit 101 and sends the differential signals Vin and /Vin. When the second control signal (of a low bit rate) is input to the switch 901, the differential amplifier 201 performs differential amplification of the bit string Din and the inverse logic bit string /Din of the bit string Din and sends the differential signals Vin and /Vin.

As described above, in the third embodiment, the transmission in the characteristic 2VL and transmission in the characteristic 3VL may be switched by the switch 901 provided in the delay circuit 101 of the transmitting circuit. When the bit rate of the input bit string Din is low and the gain of the differential signal transfer circuit 102 is kept as low as possible to reduce power consumption, selection of transmission in the characteristic 2VL in FIG. 7 is advantageous. In this case, transmission in the characteristic 2VL may be achieved easily only by inputting the inverse input bit string /Din to the input terminal IN1 of the differential signal transfer circuit 102 using the switch 901. When the bit rate of the input bit string Din becomes high, immediate switching to transmission in the characteristic 3VL may be performed only by letting the switch 901 connect the delay circuit 101 to the input terminal IN1 of the differential signal transfer circuit 102.

According to the first to third embodiments, even if characteristic fluctuations or dynamic frequency changes in a semiconductor chip are caused due to environmental changes or even if signal distortion occurs in a high frequency area or a low frequency area in a simple circuit structure to which high density mounting is applicable, it is possible to achieve stable high-speed data transmission in a semiconductor chip or between semiconductor chips. That is, a bit string may be transmitted stably at a high bit rate. In addition, the differential signal transfer circuit 102 that may be represented in the equivalent circuit in FIG. 3 is applicable to a transfer circuit with which USB 3.0 static equalization is combined, so the application field of the first to third embodiments is very wide.

The first to third embodiments are described using an example in which the differential signal transfer circuit 102 transmits light. However, these embodiments are not limited to this example and the same effects may be obtained even if the differential signal transfer circuit 102 transmits an electrical signal as is without converting electricity to light.

The first to third embodiments are only specific examples in achieving the present disclosure and do not limit the definition of the technical scope of the present disclosure. That is, the present disclosure may be achieved in various examples if there is no departure from the main spirit of the present disclosure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission apparatus, comprising:
    a transmitting circuit that receives a bit string in which an input bit string expressed as combination of 0 and 1 is preceded by a 1-bit value 0, computes a difference value between two bits adjacent to each other in the bit string, the difference value being one of among +1, 0, and −1, and sends the computed difference value; and
    a receiving circuit that stores a 1-bit value with an initial value of 0, receives the difference value +1, 0, or −1 sent by the transmitting circuit, calculates a sum of the received difference value and the stored 1-bit value, outputs, as a value of a receiving signal, 1 if the sum is 1 or more or 0 if the sum is 0 or less, and updates the stored 1-bit value to the value of the output receiving signals.

2. The transmission apparatus according to claim 1, wherein the transmitting circuit includes, a delay circuit that delays the bit string preceded by the 1-bit value 0 by one bit and
    a differential amplifier that performs differential amplification of the bit string preceded by the 1-bit value 0 and the bit string delayed by the delay circuit and sends differential signals, and
    the receiving circuit includes
    a set/reset latch circuit that receives a positive difference signal and a negative difference signal included in the differential signals from a set terminal and a reset terminal, respectively, latches the positive differential signal and the negative differential signal, and outputs the latched positive differential signal and negative differential signal as the receiving signals.

3. The transmission apparatus according to claim 2, wherein the receiving circuit includes,
    a first comparator that outputs 1 to the set terminal of the set/reset latch circuit if the positive differential signal is greater than a threshold or outputs 0 to the set terminal of the set/reset latch circuit if the positive differential signal is less than the threshold and
    a second comparator that outputs 1 to the reset terminal of the set/reset latch circuit if the negative differential signal is greater than the threshold or outputs 0 to the reset terminal of the set/reset latch circuit if the negative differential signal is less than the threshold.

4. The transmission apparatus according to claim 2, wherein the delay circuit delays a bit string in which the input bit string is preceded by a 2-bit value 10 by one bit, the differential amplifier performs differential amplification of the bit string in which the input bit string is preceded by the 2-bit value 10 and the bit string delayed by the delay circuit and sends differential signals, and the set/reset latch circuit is reset by the 2-bit value 10 and latches 0.

5. The transmission apparatus according to claim 3, wherein the delay circuit delays a bit string in which the input bit string is preceded by a 2-bit value 10 by one bit,
    the differential amplifier performs differential amplification of the bit string in which the input bit string is preceded by the 2-bit value 10 and the bit string delayed by the delay circuit and sends differential signals, and
    the set/reset latch circuit is reset by the 2-bit value 10 and latches 0.

6. The transmission apparatus according to claim 3, wherein the receiving circuit includes, a first logical product circuit that outputs a logical product of the value output from the first comparator and an inverse logic value of the value output from the second comparator to the set terminal of the set/reset latch circuit and a second logical product circuit that outputs a logical product of the value output from the second comparator and an inverse logic value of the value output from the first comparator to the reset terminal of the set/reset latch circuit.

7. The transmission apparatus according to claim 2, wherein the differential amplifier performs differential amplification of the bit string preceded by the 1-bit value 0 and the bit string delayed by the delay circuit and sends differential signals when a first control signal is input or the differential amplifier performs differential amplification of the bit string preceded by the 1-bit value 0 and the inverse logic bit string of the bit string preceded by the 1-bit value 0 and sends differential signals when a second control signal is input.

8. The transmission apparatus according to claim 3, wherein the differential amplifier performs differential amplification of the bit string preceded by the 1-bit value 0 and the bit string delayed by the delay circuit and sends differential signals when a first control signal is input or the differential amplifier performs differential amplification of the bit string preceded by the 1-bit value 0 and the inverse logic bit string of the bit string preceded by the 1-bit value 0 and sends differential signals when a second control signal is input.

9. The transmission apparatus according to claim 4, wherein the differential amplifier performs differential amplification of the bit string preceded by the 1-bit value 0 and the bit string delayed by the delay circuit and sends differential signals when a first control signal is input or the differential amplifier performs differential amplification of the bit string preceded by the 1-bit value 0 and the inverse logic bit string of the bit string preceded by the 1-bit value 0 and sends differential signals when a second control signal is input.

10. The transmission apparatus according to claim 5, wherein the differential amplifier performs differential amplification of the bit string preceded by the 1-bit value 0 and the bit string delayed by the delay circuit and sends differential signals when a first control signal is input or the differential amplifier performs differential amplification of the bit string preceded by the 1-bit value 0 and the inverse logic bit string of the bit string preceded by the 1-bit value 0 and sends differential signals when a second control signal is input.

11. The transmission apparatus according to claim 6, wherein the differential amplifier performs differential amplification of the bit string preceded by the 1-bit value 0 and the bit string delayed by the delay circuit and sends differential signals when a first control signal is input or the differential amplifier performs differential amplification of the bit string preceded by the 1-bit value 0 and the inverse logic bit string of the bit string preceded by the 1-bit value 0 and sends differential signals when a second control signal is input.

\* \* \* \* \*